United States Patent
Eschbach et al.

(10) Patent No.: US 9,965,457 B2
(45) Date of Patent: May 8, 2018

(54) METHODS AND SYSTEMS OF APPLYING A CONFIDENCE MAP TO A FILLABLE FORM

(71) Applicant: Xerox Corporation, Norwalk, CT (US)

(72) Inventors: Reiner Eschbach, Webster, NY (US); Safwan R. Wshah, Webster, NY (US); Edward Chapman, Rochester, NY (US); Phillip J. Emmett, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 67 days.

(21) Appl. No.: 14/816,159

(22) Filed: Aug. 3, 2015

(65) Prior Publication Data

US 2017/0039178 A1    Feb. 9, 2017

(51) Int. Cl.
*G06F 3/00* (2006.01)
*G06F 17/24* (2006.01)
*G06F 3/0482* (2013.01)

(52) U.S. Cl.
CPC .......... *G06F 17/243* (2013.01); *G06F 3/0482* (2013.01)

(58) Field of Classification Search
CPC .................................................. G06F 17/243
See application file for complete search history.

(56) References Cited

U.S. PATENT DOCUMENTS

| | | | |
|---|---|---|---|
| 7,761,807 B2 * | 7/2010 | Tapuska | G06F 3/0481 345/169 |
| 8,543,942 B1 * | 9/2013 | Kumar | G06F 3/0488 715/711 |
| 8,856,676 B1 | 10/2014 | Starenky et al. | |
| 2005/0091577 A1 | 4/2005 | Torres et al. | |
| 2006/0007189 A1 | 1/2006 | Gaines et al. | |
| 2006/0136845 A1 * | 6/2006 | Rimas-Ribikauskas | G06F 3/04812 715/862 |
| 2006/0267965 A1 | 11/2006 | Clary | |
| 2009/0327966 A1 | 12/2009 | Paajanen | |
| 2011/0018806 A1 | 1/2011 | Yano | |
| 2012/0063684 A1 * | 3/2012 | Denoue | G06F 17/243 382/175 |
| 2014/0258828 A1 * | 9/2014 | Lymer | G06F 17/243 715/224 |
| 2015/0049948 A1 | 2/2015 | Bala | |
| 2015/0205777 A1 | 7/2015 | Campanelli et al. | |
| 2016/0217119 A1 * | 7/2016 | Dakin | G06F 17/276 |

* cited by examiner

*Primary Examiner* — Kyle Stork
(74) *Attorney, Agent, or Firm* — Fox Rothschild LLP (57) ABSTRACT

A method of determining placement of an input indicator on an electronic fillable form may include identifying, by an electronic device, a confidence map associated with an electronic fillable form. The confidence map may include, for one or more fillable fields of the electronic fillable form, a set of coordinates that define an area associated with each of one or more zones. The method may include receiving, by the electronic device, a selection of a portion of the electronic fillable form associated with one or more selection coordinates of the electronic fillable form, identifying a zone to which the selection coordinates correspond, and causing an input indicator to be displayed in a fill zone associated with the identified zone.

20 Claims, 11 Drawing Sheets

METHODS AND SYSTEMS OF APPLYING A CONFIDENCE MAP TO A FILLABLE FORM

BACKGROUND

Paper and pencil/pen are convenient tools to use to complete forms or to edit or augment structured documents, and are often easier to use than a mouse or other input devices. However, electronic representations of these types of documents are often cumbersome to work with because the precision of the paper and pencil/pen interaction is difficult to achieve through the finger-screen interaction. As such, users often print forms, fill them in manually, and then rescan the completed document.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a method of determining placement of an input indicator on an electronic fillable form may include identifying, by an electronic device, a confidence map associated with an electronic fillable form. The confidence map may include, for one or more fillable fields of the fillable form, a set of coordinates that define an area associated with each of one or more zones. Each of the fillable fields is associated with a graphical zone, a fill zone, a click zone and a start zone. The method may include receiving, by the electronic device, a selection of a portion of the electronic fillable form associated with one or more selection coordinates of the electronic fillable form, identifying a zone to which the selection coordinates correspond, and causing an input indicator to be displayed in a fill zone associated with the identified zone.

In an embodiment, a method of determining placement of an input indicator on an electronic fillable form may include identifying, by an electronic device, a confidence map associated with an electronic fillable form. The confidence map may include, for one or more fillable fields of the fillable form, a set of coordinates that define an area associated with each of one or more zones. Each of the fillable fields is associated with a graphical zone, a fill zone, a click zone and a start zone. The method may include receiving, by the electronic device, a selection of a portion of the electronic fillable form associated with one or more selection coordinates of the electronic fillable form, identifying a plurality of zones to which the selection coordinates correspond, determining an applicable zone from the plurality of zones, wherein the applicable zone has a higher precedence than each other zone in the plurality of zones, and causing, by the electronic device, an input indicator to be displayed in a fill zone associated with the applicable zone.

In an embodiment, a system of determining placement of an input indicator on an electronic fillable form may include an electronic device and a computer-readable storage medium. The computer-readable storage medium may include one or more programming instructions that are configured to instruct the electronic device to identify a confidence map associated with an electronic fillable form. The confidence map may include, for one or more fillable fields of the fillable form, a set of coordinates that define an area associated with each of one or more zones. Each of the fillable fields is associated with a graphical zone, a fill zone, a click zone and a start zone. The computer-readable storage medium may include one or more programming instructions that are configured to instruct the electronic device to receive a selection of a portion of the electronic fillable form associated with one or more selection coordinates of the electronic fillable form, identify a zone to which the selection coordinates correspond, and cause an input indicator to be displayed in a fill zone associated with the identified zone.

In an embodiment, a system of determining placement of an input indicator on an electronic fillable form may include an electronic device, and a computer-readable storage medium. The computer-readable storage medium may include one or more programming instructions that are configured to instruct the electronic device to identify a confidence map associated with an electronic fillable form. The confidence map may include, for one or more fillable fields of the electronic fillable form, a set of coordinates that define an area associated with each of one or more zones. Each of the fillable fields is associated with a graphical zone, a fill zone, a click zone and a start zone. The computer-readable storage medium may include one or more programming instructions that are configured to instruct the electronic device to receive a selection of a portion of the electronic fillable form associated with one or more selection coordinates of the electronic fillable form, identify a plurality of zones to which the selection coordinates correspond, determine an applicable zone from the plurality of zones, wherein the applicable zone has a higher precedence than each other zone in the plurality of zones, and cause an input indicator to be displayed in a fill zone associated with the applicable zone.

DETAILED DESCRIPTION

The following terms shall have, for purposes of this application, the respective meanings set forth below:

A "computing device" or "electronic device" refers to a device that includes a processor and non-transitory, computer-readable memory. The memory may contain programming instructions that, when executed by the processor, cause the computing device to perform one or more operations according to the programming instructions. As used in this description, a "computing device" or "electronic device" may be a single device, or any number of devices having one or more processors that communicate with each other and share data and/or instructions. Examples of computing devices or electronic devices include, without limitation, personal computers, servers, mainframes, gaming systems, televisions, and portable electronic devices such as smartphones, personal digital assistants, cameras, tablet computers, laptop computers, media players and the like.

A "confidence map" refers to information pertaining to the location of one or more zones relative to a fillable form.

A "fillable field" refers to a portion of an electronic document or file in which information or data may be entered, selected, added or modified. Examples of fillable fields include, without limitation, a check box, a text field, and/or the like.

A "fillable form" or an "electronic fillable form" refers to an electronic document or file having one or more fillable fields.

An "input indicator" refers to a movable visual indicator identifying a point that will be affected by input from a user. For example, an input indicator may be a cursor showing where typed text will be inserted.

A "zone" refers to a set of coordinates that define an area of a fillable form.

As the popularity of mobile electronic devices such as, for instance, mobile phones and tablets, increases, so does the number of fillable forms being completed using such devices. However, this use brings with it a change in the ergonomics of the user interaction. For instance, tablet input is often done via direct touch with either a finger or a stylus, which are both rather coarse input tools which often do not reach the precision of a mouse pointer. Applying a multi-layer zone map to a fillable form may make inputting information to the fillable form easier and more efficient.

Figure 1:
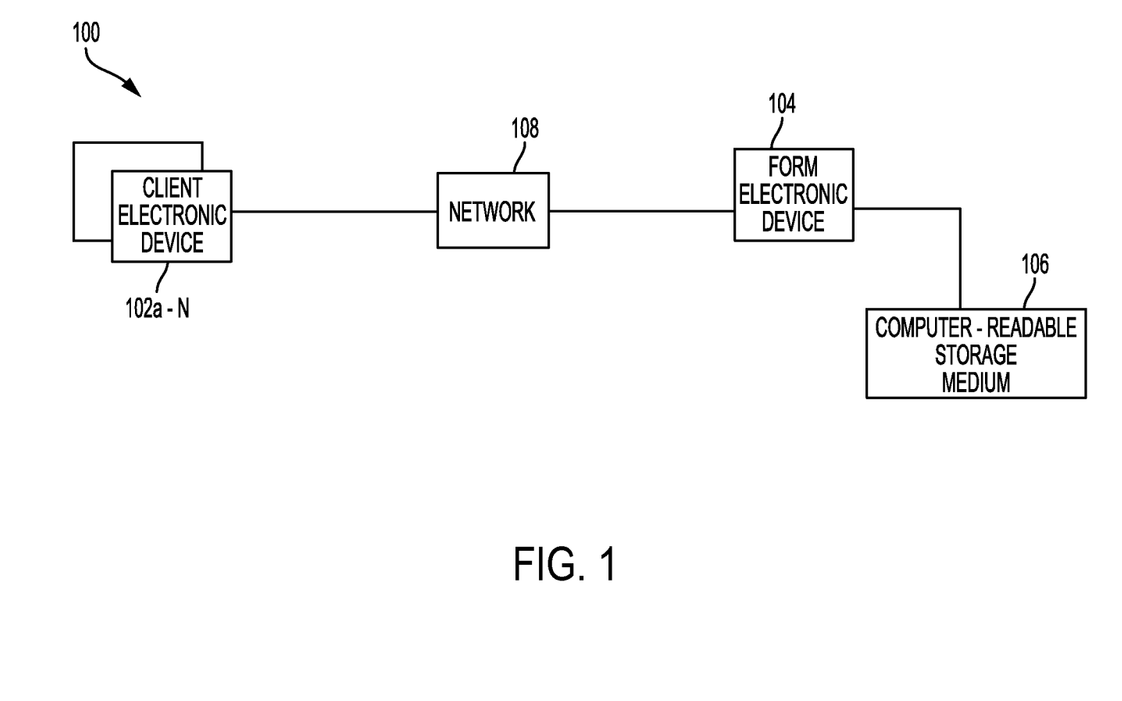
FIG. 1 illustrates an example system of creating a confidence map for a fillable form according to an embodiment.

FIG. 1 illustrates an example system of creating a confidence map for a fillable form according to an embodiment. As illustrated by FIG. 1, the system 100 may include one or more client electronic devices 102a-N, a form electronic device 104 and a computer-readable storage medium 106. One or more of the client electronic devices 102a-N may be in communication with the form electronic device 104 via a communication network 108. A communication network 108 may be a local area network (LAN), a wide area network (WAN), a mobile or cellular communication network, an extranet, an intranet, the Internet and/or the like. In various embodiments, a client electronic device 102a-N may be a mobile electronic device such as, for example, a smartphone, a tablet and/or the like.

Figure 2:
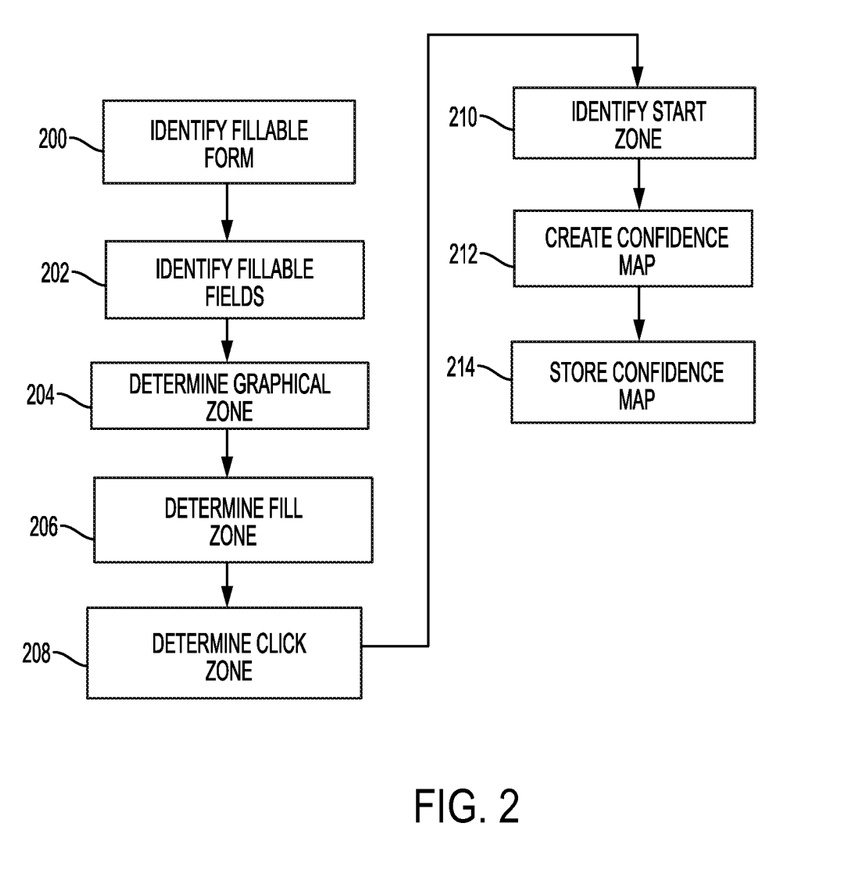
FIG. 2 illustrates a flow chart of an example method of creating a confidence map for a fillable form according to an embodiment.

FIG. 2 illustrates a flow chart of an example method of creating a confidence map for a fillable form according to an embodiment. As illustrated by FIG. 2, a processor may identify 200 a fillable form. A processor may identify 200 a fillable form by recognizing when a fillable form is opened or accessed by a user. For instance, a processor may recognize when a user accesses a fillable webpage, portable document format (PDF) document, and/or the like.

In an embodiment, a processor may identify 202 one or more fillable fields of the fillable form. A processor may create 202 a list of fillable fields by performing connected component analysis. Connected component analysis may identify one or more fillable fields of a fillable document. A fillable field may be any portion of a form in which information may be selected, added, or modified. For example, a fillable field may be a check box, a free text field and/or the like. In certain embodiments, information may be entered into a fillable form using one or more input devices such as, for example, a finger or a stylus on a touch screen display. For instance, a processor may cause one or more fillable fields to be displayed to a user via a display device associated with a client electronic device. A user may enter, select and/or modify information of a fillable field by selecting the fillable field or an area in or around the fillable field. In the case of a touch screen display device, a user may use his or her finger to touch the fillable field or an area surrounding the fillable field.

Figure 3A:
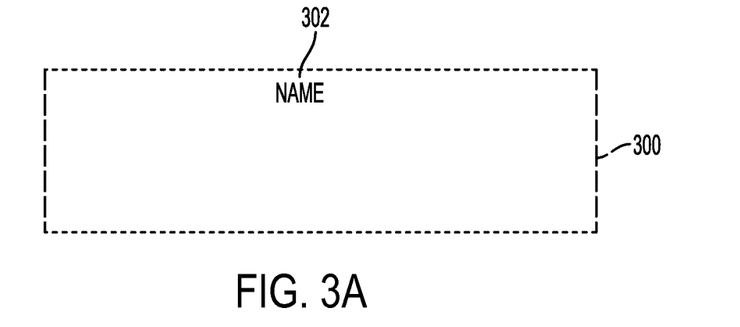
FIGS. 3A and 3B illustrate example fillable fields according to various embodiments.
Figure 3B:
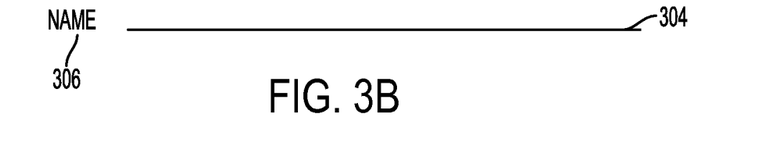

FIGS. 3A and 3B illustrate example fillable fields according to various embodiments. As illustrated by FIG. 3A, the box 300 surrounding the text "NAME" 302 may be considered a fillable field, while, as illustrated by FIG. 3B, the line 304 next to the text "NAME" 306 may be considered a fillable field.

Table 1 illustrates a listing of example identified fillable fields according to an embodiment.

TABLE 1

| X | Y | Δx | Δy |
| --- | --- | --- | --- |
| 604 | 292 | 13 | 15 |
| 618 | 292 | 13 | 15 |
| 632 | 292 | 14 | 15 |
| 648 | 292 | 12 | 15 |
| 707 | 292 | 12 | 15 |
| 728 | 292 | 14 | 15 |
| 85 | 292 | 13 | 16 |
| 101 | 292 | 12 | 16 |
| 139 | 292 | 14 | 16 |
| 156 | 292 | 12 | 16 |
| 170 | 292 | 13 | 16 |
| 185 | 292 | 14 | 16 |
| 287 | 292 | 14 | 16 |
| 309 | 292 | 13 | 16 |
| 339 | 292 | 14 | 16 |

As illustrated by Table 1, one or more fillable fields may be identified by coordinates, position, dimensions and/or the like. For example, as shown by Table 1, a fillable field may be identified by a coordinate pair (x, y value) and a delta x (Δx) and delta y (Δy) value. In various embodiments, a processor may determine 204 a graphical zone identified with one or more identified fillable fields. A graphical field may indicate a type associated with a fillable field. Example fillable fields may include, without limitation, a line, a checkbox, a box and/or the like.

In an embodiment, a processor may determine 204 a graphical zone identified with one or more fillable fields based on one or more dimensions of the fillable field. For example, a fillable field with a large delta x and a small delta y may be determined 204 to be a line fillable field. As another example, a fillable field having a delta x that is much greater than its delta y may be determined 204 to be a box fillable field. As a further example, a fillable field having a delta x that is substantially similar to its delta y may be determined 204 to be a checkbox fillable field. In various embodiments, determining 204 a graphical zone may include determining one or more indications of an area, a location or position of a graphical zone on a fillable form and/or one or more dimensions of a graphical zone, such as for example, one or more coordinates, widths, heights, lengths and/or other measurements. Additional and/or alternate fillable field types and categorizations may be used within the scope of this disclosure.

Figure 4A:
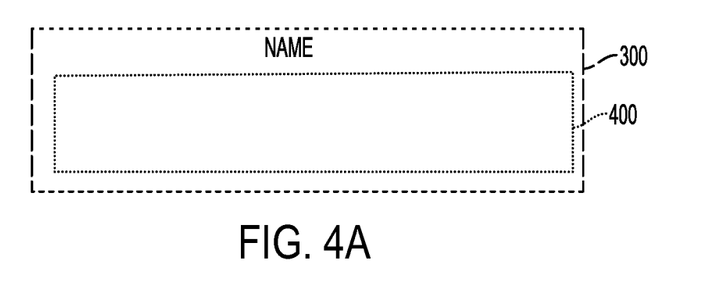
FIGS. 4A and 4B illustrate example graphical zones according to various embodiments.
Figure 4B:
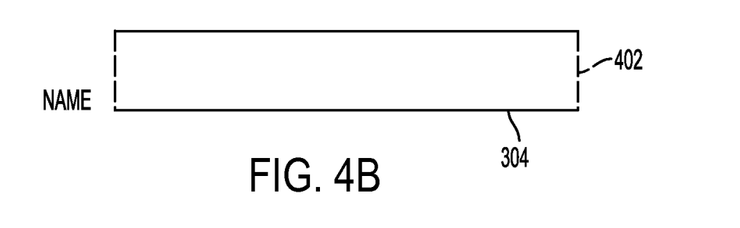

FIGS. 4A and 4B illustrate example graphical zones corresponding to the fillable fields illustrated in FIGS. 3A and 3B, respectively. As illustrated by FIG. 4A, a graphical zone 400 may fit inside the fillable field 300. As illustrated by FIG. 4B, a graphical zone 402 may sit on top of the line fillable field 304. In certain embodiments, the size of a fillable field may be greater that a size of a graphical zone which, in turn, may be greater than a size of a fillable area.

Figure 5A:
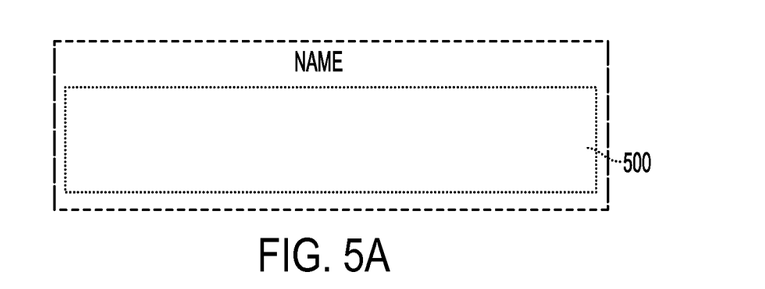
FIGS. 5A, 5B and 5C illustrate example graphical zones according to various embodiments.
Figure 5B:
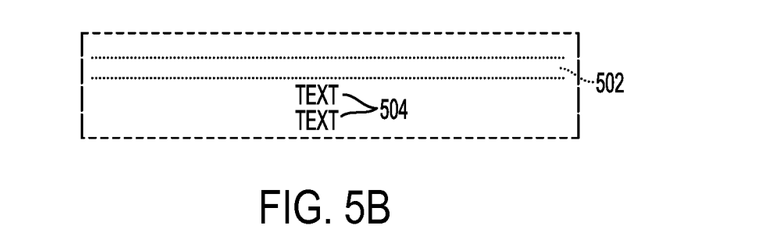
Figure 5C:
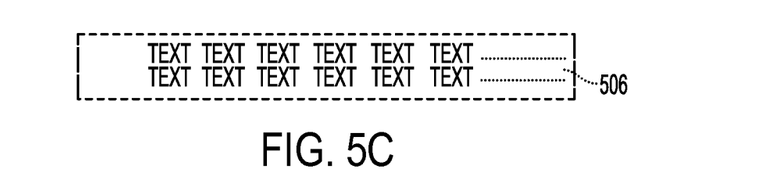

In certain embodiments, a graphical zone may be associated with a probability of being an acceptable graphical zone. An acceptable graphical zone may be one that is of a particular size, has a certain location or placement, and/or other characteristics. For example, one or more characteristics of a graphical zone, such as, for instance, placement, size, or dimensions may be based, at least in part, on characteristics of a fillable field such as, for instance, the location of static content. For example, FIGS. 5A, 5B and 5C illustrate example graphical zones according to various embodiments. The graphical zone 500 illustrated in FIG. 5A may have a high probability of being an acceptable graphical zone because it has a reasonable size and is substantially centered within the associated fillable field. The graphical zone 502 illustrated in FIG. 5B may have a lower probability of being an acceptable graphical zone because the graphical zone has a smaller size and height due to the placement of the static text 504. Likewise, the graphical zone 506 illustrated in FIG. 5C may have an even lower probability of being an acceptable graphical zone because it has a smaller size.

In an embodiment, a processor may determine a new graphical zone if an originally determined graphical zone is associated with a probability that is below a threshold value. For instance, a processor may determine a new graphical zone if a determined graphical zone is associated with a 20% or less probability of being an acceptable graphical zone. Additional and/or alternate probability values may be used within the scope of this disclosure. In certain embodiments, a process may determine a new graphical zone until one having a probability of being an acceptable graphical zone exceeds a threshold value.

In an embodiment, a processor may determine 206 a fill zone associated with one more fillable fields. A fill zone is a subset of a graphical zone and represents an area which can be filled with content because it does not have any content present. In various embodiments, the dimensions of a fill zone may be smaller than the dimensions of the corresponding graphical zone as the fill zone is a subset of the graphical zone. In various embodiments, a fill zone may determine a location of an input indicator such as, for example, pointer, cursor and/or the like when the fillable field is selected. For instance, the beginning of a fill zone may be where a user may expect to see an input indicator when the user selects the corresponding fillable field.

In some embodiments, the position or location of a fill zone may depend on whether a corresponding graphical zone includes static content, and if so, where the static content is positioned. Static content may refer to content of a form that cannot be changed, modified or altered by a user. Static content may be in any form such as, for example, text, images, graphics, pictures, icons, symbols and/or the like. An example of static content may be a text label associated with a fillable field explaining what information a user should enter into the fillable field. For example, if a graphical zone includes static content in the top of the graphical zone, a processor may determine that a fill zone includes an area below the static content. As another example, if a graphical zone includes static content in a bottom portion of the graphical zone, a processor may determine that a fill zone includes an area above the static content. If a graphical zone includes static content in a right portion of the graphical zone, a processor may determine that a fill zone includes an area to the left of the static content. In various embodiments, determining 206 a fill zone may include determining one or more indications of a location or position of a fill zone on a fillable form and/or one or more dimensions of a graphical zone, such as for example, one or more coordinates, widths, heights, lengths and/or other measurements. Additional and/or alternate positioning determinations may be made within the scope of this disclosure.

Figure 6:
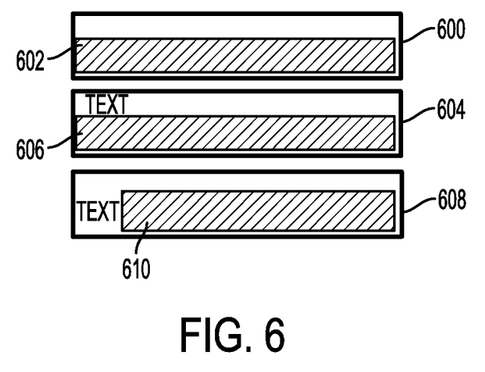
FIG. 6 illustrates example zones for three example fillable fields according to an embodiment.

FIG. 6 illustrates example fill zones and graphical zones for three example fillable fields according to an embodiment. As shown in FIG. 6, graphical zone 600 does not include any static content, so the fill zone 602 has a height of a line as estimated. Graphical zone 604 however, has static content toward the top left corner of the graphical zone, so the corresponding fillable field 606 is located below the static content. Lastly, graphical zone 608 has static content in the lower left, so the corresponding fillable field 610 is located to the right.

Referring back to FIG. 2, in various embodiments, a processor may identify 208 a click zone associated with one or more fillable fields. A click zone is a superset of a graphical zone, and may include an area within which a user may be likely to click or select in order to enter information into a fillable field. A click zone may be considered to include the graphical zone plus an additional area representative of the imprecision of pointing or selecting. In an embodiment, a processor may determine a click zone by increasing the size of the graphical zone by a certain percentage or amount. For instance, when an input device is expected to be a finger or another imprecise input device, a processor may determine a click zone by increasing the size of the graphical zone by, for example 20%. Similarly, for zones that are being displayed on electronic devices having smaller displays such as, for instance, a mobile phone, a processor may increase the size of the graphical zone by at least a certain amount, such as, for example 20%, to establish a minimum size. Additional and/or alternate size increases may be used within the scope of this disclosure.

For example, a click zone may be an area around a graphical zone that includes 20% more area than the graphical zone. In various embodiments, determining 208 a click zone may include determining one or more indications of a location or position of a click zone on a fillable form and/or one or more dimensions of a graphical zone, such as for example, one or more coordinates, widths, heights, lengths and/or other measurements.

In an embodiment, a processor may identify 210 a start zone associated with one or more fillable fields. A start zone represents a most likely click area associated with a fillable field. For example, for English forms, a start zone of a fillable field may include a leftmost portion of the graphical zone because users will most likely read and write left to right. As another example, forms in Arabic or Hebrew may have a start zone that includes a rightmost portion of a graphical zone because users will most likely read and write right to left.

Figure 7:
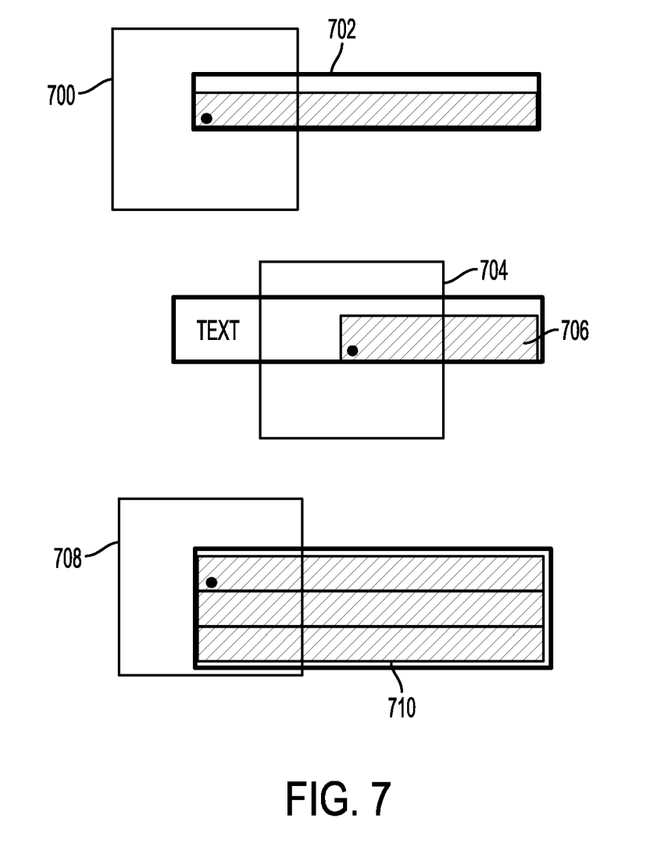
FIG. 7 illustrates example start zones according to various embodiments.

In various embodiments, a start zone may include a portion of a graphical zone and/or a fill zone. A start zone may also include at least a portion of an area that is not within the graphical zone or the fill zone. In an embodiment, a processor may identify 210 a start zone that is centered or substantially centered around a fill zone as this is the area with the highest likelihood of being selected by a user. In various embodiments, identifying 210 a start zone may include determining one or more indications of a location or position of a graphical zone on a fillable form and/or one or more dimensions of a start zone, such as for example, one or more coordinates, widths, heights, lengths and/or other measurements. FIG. 7 illustrates three examples of start zones according to an embodiment. As illustrated by FIG. 7, the start zone 700 of the top example coincides with the beginning of the graphical zone 702.

In the middle example, the start zone 704 is centered around the fill zone 706. In the bottom example, the line height influences the start zone. For graphical zones that cover multiple lines, users tend to indicate a starting area toward the top of the area, so the start zone 708 includes an area that includes the beginning of the lines in the fill zone 710.

In certain embodiments, the size, dimensions and/or positioning of one or more graphical zones, fill zones, start zones and/or click zones may vary depending on the display device on which such zones are being displayed. For instance, one or more zones may be displayed proportionally larger on an electronic device having a smaller display, for example, a mobile phone, than on an electronic device having a larger display, for example, a tablet.

In various embodiments, an electronic device may create 212 a confidence map. An electronic device may create 212 a confidence map by creating an electronic file that includes an indication of a position or location of a graphical zone, a fill zone, a click zone and/or a start zone such as, for example, one or more coordinates associated with one or more of these zones.

In an embodiment, the combination of the graphical zone, fill zone, click zone and start zone associated with a fillable field may comprise a confidence map for the fillable field. The confidence map may represent a likelihood that a click at location (x, y) should lead to an input indicator being positioned at an input location (m, n). Referring back to FIG. 2, in various embodiments, an electronic device may store 214 confidence map information associated with a confidence map, such as, for example, position or location information or one or more dimensions associated with one or more graphical zones, fill zones, click zones and/or start zones. An electronic device may store 214 confidence map information in a table, a list, a database or other similar data structure such that the confidence map information is associated with the particular fillable form to which it pertains.

Figure 8:
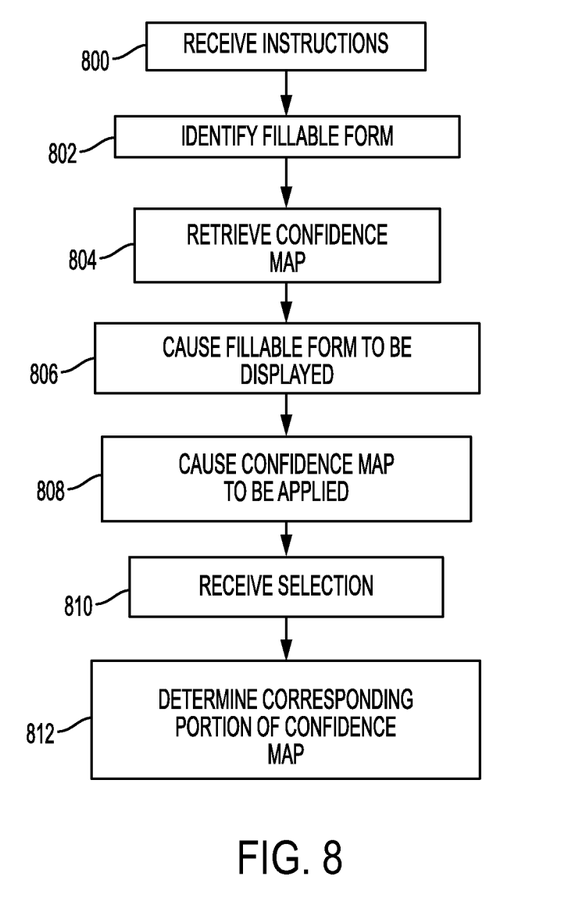
FIG. 8 illustrates a flow chart of an example method of applying a confidence map to a fillable form according to an embodiment.

In various embodiments, an electronic device may automatically apply a stored confidence map for a fillable form when the form is opened, viewed or otherwise accessed. FIG. 8 illustrates a flow chart of an example method of applying a confidence map to a fillable form according to an embodiment.

As illustrated by FIG. 8, an electronic device may receive 800 one or more instructions to access a fillable form. An electronic device may receive 800 one or more instructions to access a fillable form from a client electronic device. For instance, an electronic device may receive 800 one or more instructions to access a fillable form when a client electronic device receives an instruction from a user of the electronic device and/or a process running on the electronic device to open, view, or otherwise access a fillable form.

An electronic device may identify 802 the fillable form to be accessed. For example, an electronic device may identify 802 a fillable form to be accessed by name, uniform resource locator (URL), or other unique identifier. An electronic device may retrieve 804 a confidence map for the identified fillable form from storage. For instance, an electronic device may use a unique identifier associated with a fillable form to locate a confidence map associated with the fillable form from a database.

In an embodiment, an electronic device may cause 806 the identified fillable form to be displayed at a client electronic device, such as, for example, on a display of a client electronic device. An electronic device may cause 808 a confidence map to be applied to the fillable form. In some embodiments, an electronic device may cause 808 the confidence map to be applied to the fillable form by applying at least a portion of the confidence map as an overlay to the fillable form. The overlay may be invisible so the experience is seamless to a user.

In an embodiment, an electronic device may receive 810 a selection of the fillable form. A selection may correspond to a particular location on the fillable form, and a selection may be associated with one or more coordinates. For instance, a selection of a fillable form displayed by a touch screen display device may be made by touching the screen with a finger, a stylus and/or other input device. In some embodiments, a fillable field may correspond to a touch-sensitive portion of a display device. For instance, with respect to a touch screen, only the portions of the touch screen on which one or more fillable fields are displayed may be touch-enabled. Other portions of the fillable form being displayed by the display device may not be receptive to input via the touch screen.

In an embodiment, an electronic device may receive 810 a selection from a client electronic device. For instance, a user of a client electronic device may use an input device to make a selection of a fillable form, and the client electronic device may send information associated with the selection such as, for instance, the coordinates associated with the selection, to the electronic device.

An electronic device may determine 812 to which portion of the confidence map the selection corresponds. For instance, an electronic device may determine whether the coordinates of a selection are within a graphic zone, a click zone, a fill zone or a start zone for a particular fillable field.

Figure 9A:
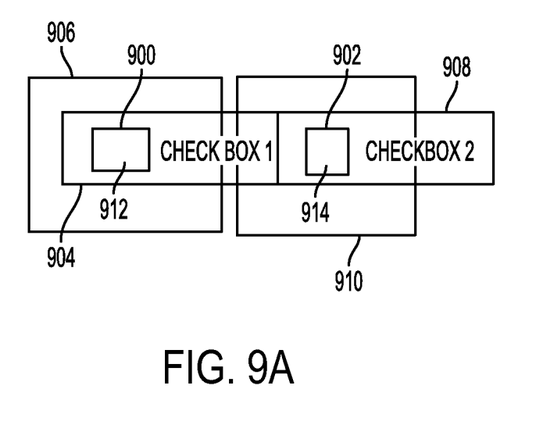
FIGS. 9A and 9B illustrate example confidence maps according to an embodiment.
Figure 9B:
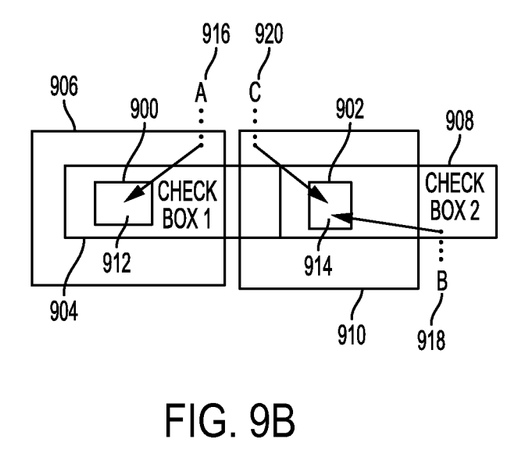

FIGS. 9A and 9B illustrate an example confidence map applied to a portion of a fillable form according to an embodiment. As illustrated by FIG. 9A, the portion includes two checkboxes 900, 902. The checkbox 900 on the left has a corresponding fill zone 912, click zone 904 and start zone 906. Likewise, the checkbox 902 on the right has a corresponding fill zone 914, click zone 908 and start zone 910. As shown by FIG. 9A, there are several points of overlap over different zones. For instance, click zone 904 and start zone 906 overlap, click zone 904 and start zone 910. FIG. 9B illustrates the confidence map shown in FIG. 9A along with several example selections.

Referring back to FIG. 8, if an electronic device determines 812 that a selection corresponds to only one of a graphical zone, a click zone, a fill zone or a start zone for a fillable field, the electronic device may cause 814 an input indicator to be displayed in the fill zone corresponding to the fillable field. For example, in FIG. 9B, selection A 916 and selection B 918 only correspond to one zone (selection A corresponds to start zone 606 and selection B corresponds to click zone 908), so an electronic device may cause an input indicator to be displayed in the corresponding fill zones 912, 914 (as illustrated by the arrows in FIG. 9B).

Referring back to FIG. 8, in an embodiment, if an electronic device determines 812 that a selection corresponds to two or more overlapping zones, the electronic device may determine 816 in which fill zone the input indicator should be displayed. In certain embodiments, one or more zones may have precedence over one or more other zones such that one zone is given more weight than one or more other zones. For instance, in an embodiment, the following precedence may be followed:

start zone>=fill zone>=graphical zone>=click zone

This means that if a selection falls within the start zone of a first fillable field and the fill zone, graphical zone or click zone of a second fillable field, the selection will be associated with the first fillable field. Additional and/or alternate precedences may be used within the scope of this disclosure.

For example, in FIG. 9B, selection C 920 falls within both the click zone 904 of checkbox 1 900 and the start zone 910 of checkbox 2 902. To determine in which fill zone of which checkbox to place the input indicator, an electronic device may analyze the one or more options in light of the applicable hierarchy. For instance, using the precedence above, an electronic device may determine that a start zone has a higher weight than a click zone, so the electronic device may cause an input indicator to be displayed in a fill zone associated with the start zone—in this case, the fill zone 914 associated with checkbox 2.

Figure 10:
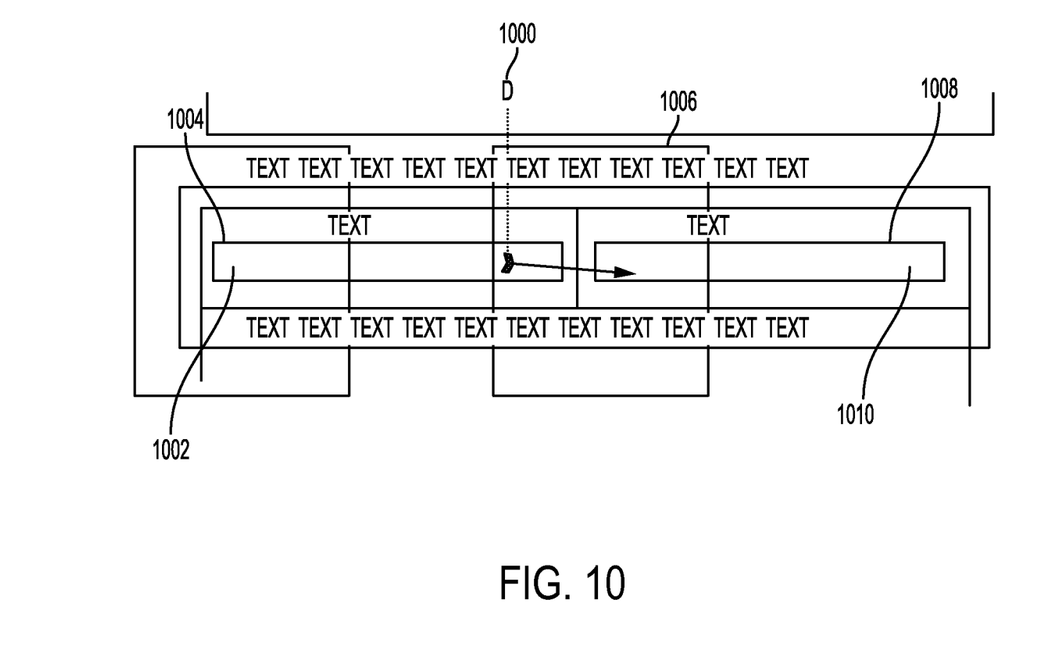
FIG. 10 illustrates an example confidence map according to an embodiment.

FIG. 10 illustrates an example confidence map according to an embodiment. As illustrated by FIG. 10, selection D 1000 falls within a fill zone 1002 of a first fillable field 1004 and a start zone 1006 of a second fillable field 1008. Given the above precedence, an electronic device may cause an input indicator to be positioned in the fill zone 1010 associated with the second fillable field 1008. However, if, in response to causing an input indicator to be positioned in the fill zone, a second selection is received in the same location or proximate to the same location as the first selection, an electronic device may cause the input indicator to be repositioned in a fill zone associated with the zone having the next highest precedence. For instance, if, after causing the input indicator to be positioned in the fill zone 1010 associated with the second fillable field 1008, an electronic device again receives a selection at or near selection D 1000, the electronic device may reposition the input indicator to be displayed in the fill zone 1002 associated with the first fillable field 1004.

Figure 11:
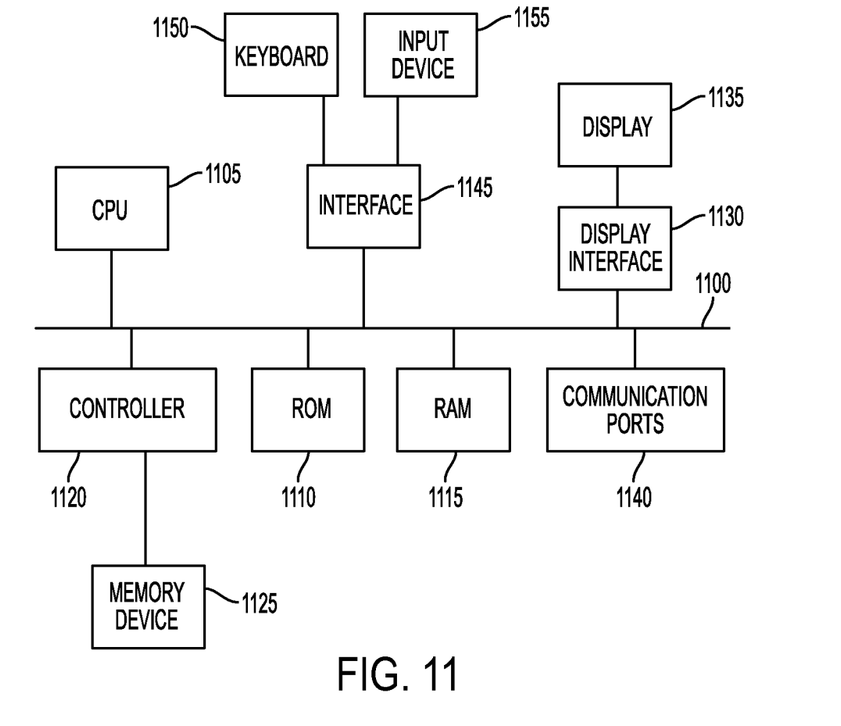
FIG. 11 illustrates a block diagram of example hardware that may be used to contain or implement program instructions according to an embodiment.

FIG. 11 depicts a block diagram of hardware that may be used to contain or implement program instructions. A bus 1100 serves as the main information highway interconnecting the other illustrated components of the hardware. CPU 1105 is the central processing unit of the system, performing calculations and logic operations required to execute a program. CPU 1105, alone or in conjunction with one or more of the other elements disclosed in FIG. 11, is an example of a production device, computing device or processor as such terms are used within this disclosure. Read only memory (ROM) 1110 and random access memory (RAM) 1115 constitute examples of non-transitory computer-readable storage media.

A controller 1120 interfaces with one or more optional non-transitory computer-readable storage media 1125 to the system bus 1100. These storage media 1125 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 1110 and/or the RAM 1115. Optionally, the program instructions may be stored on a tangible, non-transitory computer-readable medium such as a compact disk, a digital disk, flash memory, a memory card, a USB drive, an optical disc storage medium and/or other recording medium.

An optional display interface 1130 may permit information from the bus 1100 to be displayed on the display 1135 in audio, visual, graphic or alphanumeric format. Communication with external devices, such as a printing device, may occur using various communication ports 1140. A communication port 1140 may be attached to a communications network, such as the Internet or an intranet.

The hardware may also include an interface 1145 which allows for receipt of data from input devices such as a keyboard 1150 or other input device 1155 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of determining placement of an input indicator on an electronic fillable form, the method comprising:
   receiving, by an electronic device, one or more instructions to access an electronic fillable form;
   retrieving, by the electronic device, a confidence map associated with the electronic fillable form, wherein the confidence map comprises, for one or more fillable fields of the electronic fillable form, a set of coordinates that define an area associated with each of a graphical zone, a fill zone, a click zone and a start zone associated with the fillable field;
   applying the confidence map to the electronic fillable form such that each of the one or more fillable fields is associated with the graphical zone, the fill zone, the click zone and the start zone that the confidence map specifies are associated with each of the one or more fillable fields;
   receiving, by the electronic device, a selection of a portion of the electronic fillable form associated with one or more selection coordinates of the fillable electronic form;
   identifying a zone from the confidence map to which the selection coordinates correspond, wherein the identified zone is one of the graphical zones, the fill zones, the click zones or the start zones of the confidence map;

identifying, from the confidence map, a fillable field of the electronic fillable form that is associated with the identified zone; and causing an input indicator to be displayed in the fill zone associated with the identified fillable field.

2. The method of claim 1, wherein:

the graphical zone represents an area that encompasses the fillable field and any associated static text associated with the fillable field, the fill zone represents an area that is a subset of the graphical zone, wherein no content of the electronic fillable form is present in the fill zone, the click zone represents an area that is a superset of the graphical zone, and the start zone represents a most likely selection area for the fillable field.

3. The method of claim 1, wherein identifying a zone from the confidence map to which the selection coordinates correspond comprises identifying the zone having an area that encompasses the selection coordinates.

4. A method of determining placement of an input indicator on an electronic fillable form, the method comprising:

identifying, by an electronic device, a confidence map associated with an electronic fillable form, wherein the confidence map comprises, for one or more fillable fields of the electronic fillable form, a set of coordinates that define an area associated with each of one or more zones, wherein each of the fillable fields is associated with a graphical zone, a fill zone, a click zone and a start zone;

applying the confidence map to the electronic fillable form such that each of the one or more fillable fields is associated with the graphical zone, the fill zone, the click zone and the start zone that the confidence map specifies are associated with each of the one or more fillable fields;

receiving, by the electronic device, a selection of a portion of the electronic fillable form associated with one or more selection coordinates of the electronic fillable form;

identifying a plurality of zones from the confidence map to which the selection coordinates correspond;

determining an applicable zone from the plurality of zones, wherein the applicable zone has a higher precedence than each other zone in the plurality of zones; and causing, by the electronic device, an input indicator to be displayed in the fill zone of the fillable field to which the applicable zone corresponds.

5. The method of claim 4, wherein:

the graphical zone represents an area that encompasses the fillable field and any associated static text associated with the fillable field, the fill zone represents an area that is a subset of the graphical zone, wherein no content of the electronic fillable form is present in the fill zone, the click zone represents an area that is a superset of the graphical zone, and the start zone represents a most likely selection area for the fillable field.

6. The method of claim 4, wherein identifying the plurality of zones from the confidence map to which the selection coordinates correspond comprises identifying the plurality of zones that each have an area that encompasses the selection coordinates.

7. The method of claim 4, wherein:

identifying the plurality of zones from the confidence map to which the selection coordinates correspond comprises identifying the start zone and one or more of the click zone, the fill zone and the graphical zone; and determining an applicable zone comprises selecting the start zone as the applicable zone.

8. The method of claim 4, wherein:

identifying the plurality of zones from the confidence map to which the selection coordinates correspond comprises identifying the fill zone and one or more of the click zone and the graphical zone; and determining an applicable zone comprises selecting the fill zone as the applicable zone.

9. The method of claim 4, wherein:

identifying the plurality of zones from the confidence map to which the selection coordinates correspond comprises identifying the graphical zone and the click zone; and determining an applicable zone comprises selecting the graphical zone as the applicable zone.

10. The method of claim 4, further comprising:

receiving a second selection of a portion of the electronic fillable form associated with one or more second selection coordinates that are in proximity to the one or more selection coordinates;

determining an updated applicable zone from the plurality of zones, wherein the updated applicable zone has a higher precedence than each other zone in the plurality of zones except the applicable zone; and causing, by the electronic device, the input indicator to be displayed in the fill zone associated with the updated applicable zone.

11. A system of determining placement of an input indicator on an electronic fillable form, the system comprising:

an electronic device; and a computer-readable storage medium comprising one or more programming instructions that are configured to instruct the electronic device to:

receive one or more instructions to access an electronic fillable form, retrieve a confidence map associated with the electronic fillable form, wherein the confidence map comprises, for one or more fillable fields of the electronic fillable form, a set of coordinates that define an area associated with each of a graphical zone, a fill zone, a click zone and a start zone, apply the confidence map to the electronic fillable form such that each of the one or more fillable fields is associated with the graphical zone, the fill zone, the click zone and the start zone that the confidence map specifies are associated with each of the one or more fillable fields, receive a selection of a portion of the electronic fillable form associated with one or more selection coordinates of the electronic fillable form, identify the zone from the confidence map to which the selection coordinates correspond, wherein the identified zone is one of the graphical zones, the fill zones, the click zones or the start zones of the confidence map, identify, from the confidence map, a fillable field of the electronic fillable form that is associated with the identified zone, and cause an input indicator to be displayed in the fill zone associated with the identified fillable field.

12. The system of claim 11, wherein:
the graphical zone represents an area that encompasses the fillable field and any associated static text associated with the fillable field,
the fill zone represents an area that is a subset of the graphical zone, wherein no content of the electronic fillable form is present in the fill zone,
the click zone represents an area that is a superset of the graphical zone, and
the start zone represents a most likely selection area for the fillable field.

13. The system of claim 11, wherein the one or more programming instructions that are configured to instruct the electronic device to identify a zone to which the selection coordinates correspond comprise one or more programming instructions that are configured to instruct the electronic device to identify a zone having an area that encompasses the selection coordinates.

14. A system of determining placement of an input indicator on an electronic fillable form, the system comprising:
an electronic device; and
a computer-readable storage medium comprising one or more programming instructions that are configured to instruct the electronic device to:
identify a confidence map associated with an electronic fillable form, wherein the confidence map comprises, for one or more fillable fields of the electronic fillable form, a set of coordinates that define an area associated with each of one or more zones, wherein each of the fillable fields is associated with a graphical zone, a fill zone, a click zone and a start zone,
apply the confidence map to the electronic fillable form such that each of the one or more fillable fields is associated with the graphical zone, the fill zone, the click zone and the start zone that the confidence map specifies are associated with each of the one or more fillable fields,
receive a selection of a portion of the electronic fillable form associated with one or more selection coordinates of the electronic fillable form,
identify a plurality of zones from the confidence map to which the selection coordinates correspond,
determine an applicable zone from the plurality of zones, wherein the applicable zone has a higher precedence than each other zone in the plurality of zones, and
cause an input indicator to be displayed in the fill zone of the fillable field to which the applicable zone corresponds.

15. The system of claim 14, wherein:
the graphical zone represents an area that encompasses the fillable field and any associated static text associated with the fillable field,
the fill zone represents an area that is a subset of the graphical zone, wherein no content of the electronic fillable form is present in the fill zone,
the click zone represents an area that is a superset of the graphical zone, and
the start zone represents a most likely selection area for the fillable field.

16. The system of claim 14, wherein the one or more programming instructions that are configured to instruct the electronic device to identify the plurality of zones from the confidence map to which the selection coordinates correspond comprise one or more programming instructions that are configured to instruct the electronic device to identify the plurality of zones that each have an area that encompasses the selection coordinates.

17. The system of claim 14, wherein:
the one or more programming instructions that are configured to instruct the electronic device to identify the plurality of zones from the confidence map to which the selection coordinates correspond comprise one or more programming instructions that are configured to instruct the electronic device to identify the start zone and one or more of the click zone, the fill zone and the graphical zone; and
the one or more programming instructions that are configured to instruct the electronic device to determine the applicable zone comprise one or more programming instructions that are configured to instruct the electronic device to select the start zone as the applicable zone.

18. The system of claim 14, wherein:
the one or more programming instructions that are configured to instruct the electronic device to identify the plurality of zones from the confidence map to which the selection coordinates correspond comprise one or more programming instructions that are configured to instruct the electronic device to identify the fill zone and one or more of the click zone and the graphical zone; and
the one or more programming instructions that are configured to instruct the electronic device to determine the applicable zone comprise one or more programming instructions that are configured to instruct the electronic device to select the fill zone as the applicable zone.

19. The system of claim 14, wherein:
the one or more programming instructions that are configured to instruct the electronic device to identify the plurality of zones from the confidence map to which the selection coordinates correspond comprise one or more programming instructions that are configured to instruct the electronic device to identify the graphical zone and the click zone; and
the one or more programming instructions that are configured to instruct the electronic device to determine the applicable zone comprise one or more programming instructions that are configured to instruct the electronic device to select the graphical zone as the applicable zone.

20. The system of claim 14, wherein the computer-readable storage medium further comprises one or more programming instructions that are configured to instruct the electronic device to:
receive a second selection of a portion of the electronic fillable form associated with one or more second selection coordinates that are in proximity to the one or more selection coordinates;
determine an updated applicable zone from the plurality of zones, wherein the updated applicable zone has a higher precedence than each other zone in the plurality of zones except the applicable zone; and
cause the input indicator to be displayed in the fill zone associated with the updated applicable zone.

* * * * *